E. SCHNEIDER.
TRACTOR HAVING FOUR STEERING DRIVING WHEELS.
APPLICATION FILED OCT. 29, 1920.

1,422,380.

Patented July 11, 1922.
5 SHEETS—SHEET 3.

E. SCHNEIDER.
TRACTOR HAVING FOUR STEERING DRIVING WHEELS.
APPLICATION FILED OCT. 29, 1920.
1,422,380.
Patented July 11, 1922.
5 SHEETS—SHEET 4.
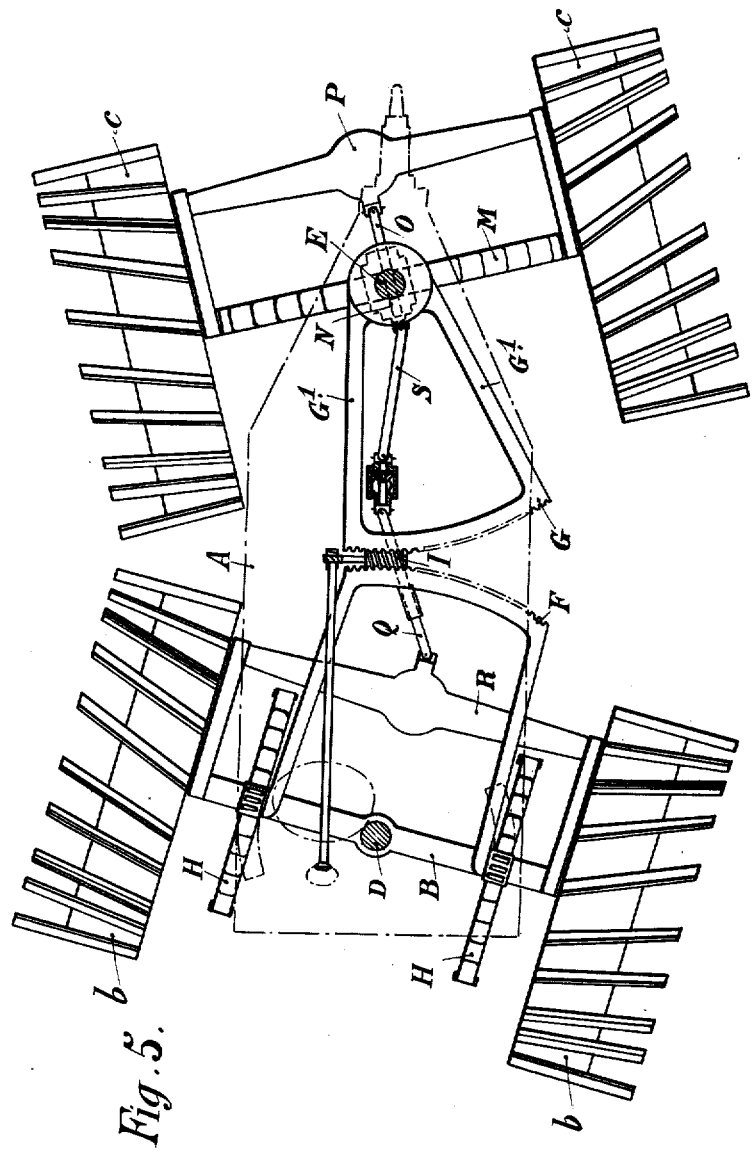

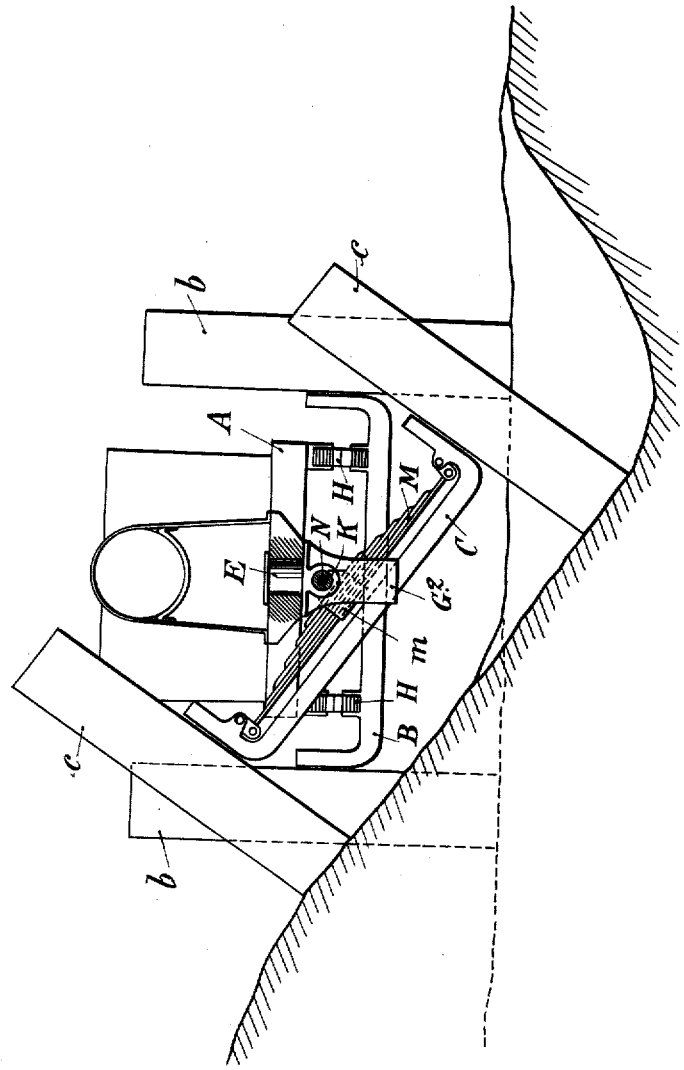

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

TRACTOR HAVING FOUR STEERING DRIVING WHEELS.

1,422,380.

Specification of Letters Patent.  Patented July 11, 1922.

Application filed October 29, 1920. Serial No. 420,526.

*To all whom it may concern:*

Be it known that I, EUGÈNE SCHNEIDER, citizen of the Republic of France, resident of Paris, France, have invented new and useful Improvements in Tractors Having Four Steering Driving Wheels, which invention is fully set forth in the following specification.

This invention has for its object to provide an improved tractor having four driving wheels carried by two swivelling trucks which are connected together in such a manner that by the action of a common steering gear they will always be turned through the same angle but in opposite directions relatively to the longitudinal axis of the vehicle.

The improved tractor is of the known type wherein the two road axles are pivoted each to a common chassis or to a platform by means of a vertical axle-pin; the connection between the two axles being effected by means of two toothed sectors fixed to the axles and meshing with a common worm operated by the steering gear.

The essential characteristic feature of the improved tractor is a peculiar construction of the rear axle which, although being pivoted to the chassis and connected to the front axle, is able to turn freely in the vertical direction in such a manner as to assume at all times an inclination suited to the unevenness of the ground.

With this object, the rear axle, instead of being pivoted, like the front axle, directly around the vertical pivot pin of the chassis, is pivoted about a horizontal axle pin parallel to the planes of the wheels, to its steering toothed sector which is fixed to the vertical pivot connecting it to the chassis and movable in said chassis.

This horizontal axle-pin forms a bearing for an intermediate shaft, one end of which is connected by means of a Cardan joint to a shaft that is in turn connected by means of a universal joint to the differential of the hind wheels, the other end of the said intermediate shaft being connected through a Cardan gear to the engine.

A constructional form of this invention is illustrated by way of example in the accompanying drawings in which:—

Figure 1:
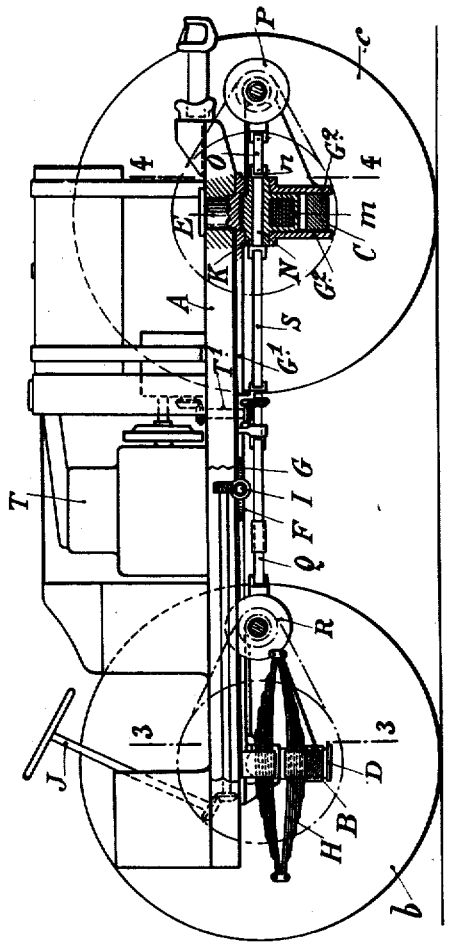
Fig. 1 is a longitudinal elevation of the improved tractor in partial section along the axis of the horizontal pivot pin of the rear axle.
Figure 2:
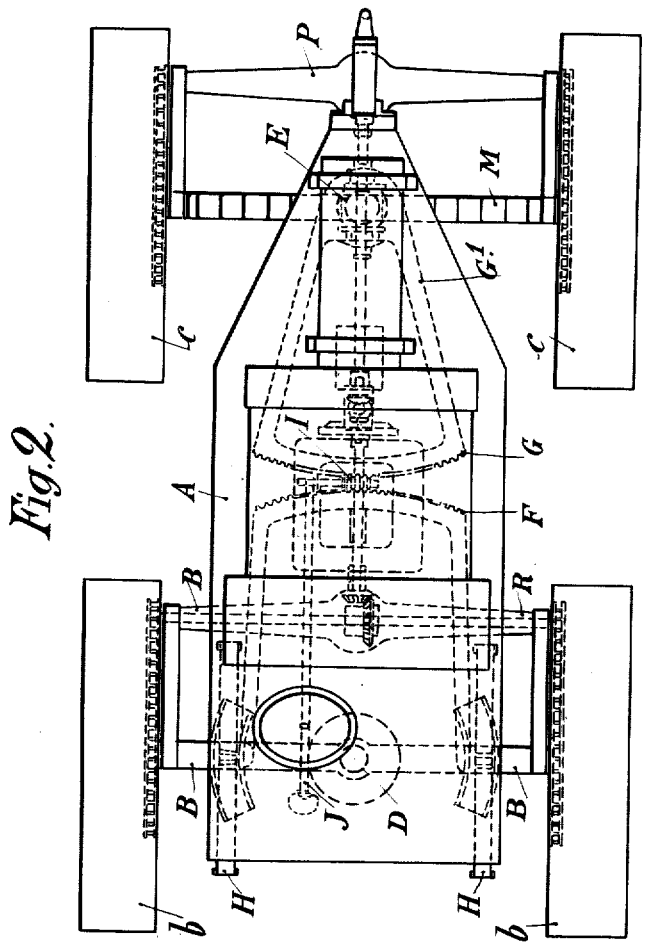
Fig. 2 is a plan thereof.
Figure 3:
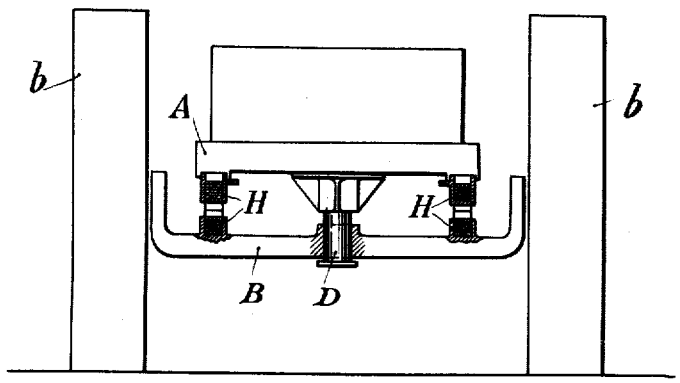
Figure 4:
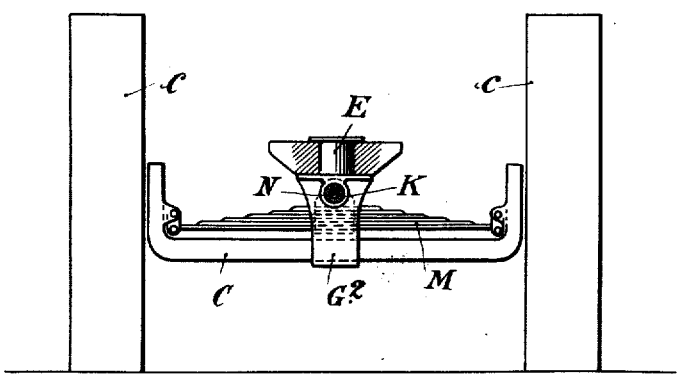

Figs. 3 and 4 are partial cross sections on the lines 3—3 and 4—4 respectively of Fig. 1.

Fig. 5 is a plan after removal of the chassis of the vehicle; the two axles being shown swivelled for the purpose of travelling around a curve.

Fig. 6 is an elevation in partial section through the pivotal joint of the rear axle, showing the latter inclined transversely with relation to the front axle and the chassis.

The improved vehicle comprises a chassis or a platform A supported by means of springs H, upon the front axle of which B indicates the axle proper and *b* the wheels. The chassis is likewise supported through the medium of springs M upon the rear axle. C is the rear axle proper, of which *c* and *c* are the wheels. D is a vertical pivot pin carried by the chassis A; the front axle B is capable of turning around this pin for steering purposes. E is a vertical pivot pin movable in the chassis A and fixed to the rear axle in its turning movements.

The connection between the two driving axles for the purpose of turning them simultaneously for steering, is effected by means of two toothed sectors F, G. The toothed sector F is carried by a frame fixed to the springs H by which the chassis A is suspended from the front axle B. The toothed sector G is carried by a frame $G^1$ fixed to the pivot pin E. The sectors F and G mesh with a common worm I that is connected by a suitable gear to the steering spindle J. The frame $G^1$ has cheeks $G^2$ depending on either side of the rear axle C. It carries an axle-pin or pivot-pin K that is at right angles to the pivot E and is parallel to the plane of the hind wheels. The rear axle can be caused to rock around this pivot-pin K, for instance as shown in the drawings, through the medium of the buckle *m* of a transverse leaf spring M from which the said rear axle is suspended. The transverse rocking of the rear axle takes place between the cheeks $G^2$ by which the said axle is carried around in its turning movements.

The axle pin K serves as a bearing for a shaft N. One end n of this shaft is connected through a Cardan joint to a shaft O whose opposite end is connected in its turn through a Cardan joint to the differential P (of known construction) that drives the hind wheels c.

The connection between the engine T carried by the chassis A, and the two driving axles, is effected in the known manner by a vertical shaft T¹ which is connected through a suitable gear on the one hand to a Cardan joint Q connected to the differential R driving the front wheels, and on the other hand to a Cardan joint S that is connected to the front end of the intermediate shaft N.

In contradistinction to the known tractors having four driving wheels and comprising a chassis and two steering axles, the improved tractor of the present invention has the advantage of comprising a rear axle that is capable of assuming different levels in the transverse plane of the vehicle.

In contradistinction to the known tractors having four driving wheels and comprising only two trucks jointed relatively to each other and capable each of assuming different levels in the transverse plane of the vehicle, the improved tractor of the present invention has the advantage of allowing a load to be accommodated in a more convenient manner, as well as of enabling the engine to be situated close to the centre of the vehicle, which facilitates considerably the balancing of the vehicle and the distribution of the loads on the two trucks.

Having now particularly described and ascertained the nature of my said invention and in what manner the same is to be performed, I declare that what I claim is:—

1. A tractor comprising a chassis provided with a fixed depending vertical pivot at one end and a vertical bearing at the opposite end, axles connected with the respective ends of said chassis for movement about the axes of said vertical depending pin and the vertical bearing, said axles being provided with driving wheels, steering means for said driving wheels comprising a steering member mounted on the chassis and steering sectors connected with the steering member and said axles, one of said sectors having a pivot pin journaled in said vertical bearing, and a horizontal pivot pin connecting one of said axles with said sector below the vertical pin thereof to provide for independent swinging movement of the axle transversely of said chassis.

2. A tractor comprising a chassis, axles connected to the respective ends of said chassis for movement about vertical axes, driving wheels at the respective ends of said axles, and means providing for swinging movement of one of said axles transversely of the chassis comprising a steering sector having a bearing on the chassis coincident with the vertical axis of said axle, spaced cheeks formed on said sector and engaging said axle, a horizontally disposed axle pin carried by said cheeks, a member journaled on said horizontally disposed pin and resiliently connected with said axle, and a steering member mounted on the chassis and connected with said sector.

3. A tractor comprising a chassis, axles connected to said chassis at the respective ends thereof and provided with driving wheels, and means for swinging one of said axles around a vertical pivot and providing for movement of said axle around a horizontal pivot, said means comprising a steering sector provided with a vertical pivot pin journaled in the chassis, a pair of spaced cheeks formed on said sector and engaging the axle, an axle pin connected with the axle and journaled in said cheeks at right angles to said vertical pin, and a steering member mounted on the chassis and operatively connected with said sector.

In testimony whereof I have signed this specification.

EUGÈNE SCHNEIDER.

Witnesses:
ANDRÉ MOSTICKER,
LOUIS GARDET.